United States Patent
Becker et al.

(10) Patent No.: US 10,605,240 B2
(45) Date of Patent: Mar. 31, 2020

(54) DELIVERY DEVICE HAVING A CONNECTING ROD, AND A METHOD FOR CONTROLLING A DELIVERY DEVICE HAVING A CONNECTING ROD AND AT LEAST ONE BALANCE WEIGHT

(75) Inventors: Günter Becker, Östringen (DE); Dirk Degen, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 714 days.

(21) Appl. No.: 13/704,528

(22) PCT Filed: May 18, 2011

(86) PCT No.: PCT/EP2011/002464
§ 371 (c)(1),
(2), (4) Date: Dec. 14, 2012

(87) PCT Pub. No.: WO2011/157337
PCT Pub. Date: Dec. 22, 2011

(65) Prior Publication Data
US 2013/0089439 A1 Apr. 11, 2013

(30) Foreign Application Priority Data
Jun. 14, 2010 (DE) .................. 10 2010 023 630

(51) Int. Cl.
*F04C 29/02* (2006.01)
*F04B 47/02* (2006.01)
(Continued)

(52) U.S. Cl.
CPC .......... *F04B 47/022* (2013.01); *E21B 43/127* (2013.01); *E21B 47/0008* (2013.01); *F04B 47/14* (2013.01); *F16F 15/28* (2013.01)

(58) Field of Classification Search
CPC ...... F04B 47/022; F04B 47/14; E21B 43/127; E21B 47/0008
(Continued)

(56) References Cited

U.S. PATENT DOCUMENTS 2,915,919 A * 12/1959 Mitchell et al. ................ 74/590
3,016,767 A    1/1962 Egan et al.
(Continued)

FOREIGN PATENT DOCUMENTS

DE   1 912 779    3/1965
WO   01/55552     8/2001

OTHER PUBLICATIONS

International Preliminary Report on Patentability and Written Opinion, dated Dec. 27, 2012, issued in corresponding International Application No. PCT/EP2011/002464.
(Continued)

*Primary Examiner* — Charles G Freay
(74) *Attorney, Agent, or Firm* — Hunton Andrews Kurth LLP

(57) ABSTRACT

A delivery device having a connecting rod, and a method for controlling a delivery device having a connecting rod and at least one balance weight, includes a part that is permanently connected to a shaft, on which part a pivot bearing is situated, by which the first end region of the connecting rod is accommodated by the part, in particular such that the connecting rod is able to be driven in eccentric manner, balance weights being situated on the part so as to be displaceable by a first drive, a first computer being provided on the part, which controls the displacement of the balance weights.

4 Claims, 3 Drawing Sheets

(51) Int. Cl.
    *E21B 43/12* (2006.01)
    *F04B 47/14* (2006.01)
    *E21B 47/00* (2012.01)
    *F16F 15/28* (2006.01)
(58) Field of Classification Search
    USPC .................................................. 417/218, 328
    See application file for complete search history.

(56) References Cited

U.S. PATENT DOCUMENTS

| | | | |
|---|---|---|---|
| 4,377,092 A * | 3/1983 | Garmong | F04B 47/028 74/41 |
| 4,660,426 A * | 4/1987 | Mosley | 74/41 |
| 5,528,947 A * | 6/1996 | Wang et al. | 74/41 |
| 6,386,322 B1 | 5/2002 | McCormick | |
| 8,272,845 B1 * | 9/2012 | Watson | 417/53 |
| 9,033,676 B2 * | 5/2015 | Palka | E21B 43/127 417/44.1 |
| 2006/0060011 A1 | 3/2006 | Jensen | |

OTHER PUBLICATIONS

International Search Report, issued in corresponding International Application No. PCT/EP2011/002464.

* cited by examiner

DELIVERY DEVICE HAVING A CONNECTING ROD, AND A METHOD FOR CONTROLLING A DELIVERY DEVICE HAVING A CONNECTING ROD AND AT LEAST ONE BALANCE WEIGHT

FIELD OF THE INVENTION

The present invention relates to a delivery device having a connecting rod, and to a method for controlling a delivery device having a connecting rod and at least one balance weight.

BACKGROUND INFORMATION

It is conventional that deep-well pumps are driven by a drive. If the drive is realized as an electric drive, the effective power of the drive is able to be recorded. If the effective power has a negative preceding sign, the drive operates as generator, and a positive preceding sign means that the drive operates as a motor. The drive, for example, can be implemented as a gear unit which is drivable by an electric motor. A change between motor and generator operating modes triggers a teeth flank change of the gear teeth components of the gear unit, which reduces the service life.

SUMMARY

Example embodiments of the present invention provide a delivery device having a connecting rod, and a method for controlling a delivery device having a connecting rod and at least one balance weight, and in so doing, achieve better environmental protection and, in particular, a longer service life.

Among features of the delivery device having a connecting rod are that the device includes a part which is permanently connected to a shaft; situated on the part is a pivot bearing, by which the first end region of the connecting rod is accommodated by the part, in particular such that the connecting rod is able to be driven in eccentric manner, and balance weights are situated on the part, such that they are able to be displaced by a first drive, a first computer being provided on the part, which controls the displacement of the balance weights.

This has the advantage that an ongoing motor operation of the device is achievable, so that tooth flank changes are able to be avoided and the service life improved as a result. When changes in the load arise, for example due to viscosity changes of the medium to be delivered, the balance weights are displaced such that a generator operation is prevented at each rotation of the part, such as the crank disk, at all times. In addition, the rectifier supplies the generator energy to a brake resistor for conversion into thermal energy. Avoiding a generator operation thus results in better environmental protection.

In one advantageous development, the pivot bearing is situated on the part so as to be displaceable by a second drive, so that the distance between the pivot bearing and the center axis of the shaft is variable, the displacement of the pivot bearing being controllable by the first computer, in particular. This has the advantage that the lift, and thus the output volume as well, is variable.

In one advantageous development, the shaft is a driven shaft of a gear unit, which is driven by an electric motor and/or a combustion engine. This has the advantage that the effective power is able to be recorded, so that generator operating modes are easily and rapidly detectable, especially during electromotive operation.

In one advantageous development, the balance weights are situated so as to be displaceable, such that the center of gravity of the system made up of the part, the balance weights and the associated components fixedly connected to the part, is displaceable parallel to the connecting line between pivot bearing and axis of the shaft. This offers the advantage that shifting the center of gravity also may be utilized to avoid a possibly occurring generator operation in an angular range of the rotation of the driven shaft of the gear unit, in that the balance weights, and thus the center of gravity, is shifted appropriately.

In one advantageous further refinement, the delivery device is a deep-well pump, especially an oil pump for pumping crude oil. This has the advantage that drives may be situated on the rotatably mounted part which is permanently connected to the driven shaft and thus rotates along with it, the drives being suitable for adjusting the balance weights or for adjusting the pivot bearing and able to be supplied in contactless manner.

In one advantageous development, the part includse a crank disk and/or a single weight plate, or at least two weight plates. This advantageously makes it possible to compensate for imbalances.

In one advantageous development, a first computer, which has a data exchange link to a stationary second computer, is situated on the part, the data exchange link in particular being implemented as a contactless and/or touchless link, especially by electromagnetic waves such as infrared waves or radio waves. This has the advantage that electric drives which are able to be supplied in contactless manner may be mounted on the part that is rotatably supported via the driven shaft.

In one advantageous development, a device for detecting the effective power of the drive which is driving the shaft is connected to the stationary second computer. This offers the advantage that the effective power is able to be recorded in a simple manner, e.g., in that the active current and the active voltage are determined with the aid of a rectifier feeding the electric motor. This is so because in the rectifier, measured current values and measured voltage values are supplied to the control electronics there, so that it is possible to determine the effective power with a negligible investment in additional work.

In one advantageous development, the first computer and the additional electrical consumers situated on the part is supplied in contactless, especially inductive, manner, a primary conductor system in particular being situated in stationary manner, and at least one secondary winding, which is provided in inductively coupled form, being provided on the part, a capacitance being connected to the secondary winding in parallel and/or in series in particular, and the associated resonant frequency substantially corresponding to the frequency of an alternating current impressed upon the primary conductor system. This offers the advantage that consumers on the rotating part are able to be supplied with energy in contactless and touchless manner. Thus, the required power for adjusting the drives may be provided even if in a dirty environment.

Among features of the method for controlling a delivery system having a connecting rod and at least one balance weight are that the connecting rod is driven by a drive, especially in eccentric manner, in particular via a crank disk implemented as part, and the effective power of the drive is recorded, and the balance weight, or at least one balance weight, is shifted as a function of the recorded effective power, especially as a function of its preceding sign, and/or as a function of values, especially extreme values, determined from the time characteristic of the effective power.

This has the advantage that a generator operation is able to be discovered immediately and made to disappear by shifting the balance weights.

In one advantageous development, a pivot bearing for the connecting rod is mounted on the part so as to be displaceable, so that the distance between pivot bearing and center axis of the shaft is variable, the distance being varied, i.e., the pivot bearing being shifted, in particular, as a function of the detected effective power and/or as a function of values, especially extreme values, determined from the time characteristic of the effective power. This has the advantage that the lift of the pump is variable, which therefore means that the delivery rate is variable. As a result, the output of the electric drive is able to be utilized to the full extent.

In one advantageous development, a local extreme, especially a local minimum, is determined from the time characteristic of the effective power, and the associated effective power value is supplied to a first controller as actual value, the actual value being controlled toward a setpoint value by using the displacement of the balance weight as actuating variable of the controller, especially in order to achieve pure motor operation of the drive, the setpoint value being zero, in particular, or having a positive value which is smaller than one fifth, smaller than one tenth, or smaller than one twentieth of the nominal power or the permanently maximally allowed output of the drive. This has the advantage of ensuring that the motor operating mode will be maintained even if a change in the viscosity of the medium to be pumped or in the pumping depth occurs. In particular a rapidly responding controller is used for that purpose, and the setpoint value is set to the positive, non-vanishing range of the effective power.

Preferably, a linear controller, which may additionally also include a pilot control, is able to be used. Not only proportional controllers, i.e., P controllers, but also PI controllers or even PID controllers are advantageously usable as linear controllers.

In one advantageous development, a local extreme, especially a local maximum, is determined from the time characteristic of the effective power, and the associated effective power value is supplied to a second controller as actual value, the actual value being controlled toward a setpoint value by using the displacement of the pivot bearing as actuating variable of the controller, especially in order to optimize the delivery rate or to achieve a desired delivery rate, in particular one predefined by a superposed control, the setpoint value in particular being the nominal output of the drive or at least exceeding 80% of the nominal output of the drive. This offers the advantage that the electric drive is usable to optimal effect and need not have oversize dimensions.

In one advantageous development, the first and second controllers are temporally operated in alternation, the first controller in particular being operated for a first time period, especially a predefinable time period, and the second controller then being operated for a second time period, especially a predefinable time period. This has the advantage, for example, that if a viscosity change has occurred or a change in the pumping depth or flow depth, a generator operation first of all is preventable and the capacity of the electric drive, and thus the delivery rate, then is able to be optimized.

In one advantageous development, the first controller is active at a lower time constant than the second controller, the first and second controllers in particular being operated simultaneously. This has the advantage that a simultaneous operation is possible and the first controller is operable at higher priority nevertheless. For the time constant refers to the time period during which a change in the actual value is adjustable, that is to say, until the actual value substantially has been controlled toward the setpoint value if no other interference is encountered. In other words, if the first controller is designed such that it is operated at least five times or even at least ten times faster than the second controller, the minimum values of the time characteristic of the effective power are very rapidly controlled to zero or a corresponding setpoint value, while the maximum values are controlled toward their setpoint value, such as the nominal output, more slowly. The two controllers are temporally decoupled, so to speak, and thus do not interfere with each other.

Further features, aspects, and advantages of example embodiments of the present invention are described in more detail below. Additional combination possibilities of features described herein are possible.

Example embodiments of the present invention are explained in greater detail below with reference to the appended Figures.

DETAILED DESCRIPTION

Figure 1:
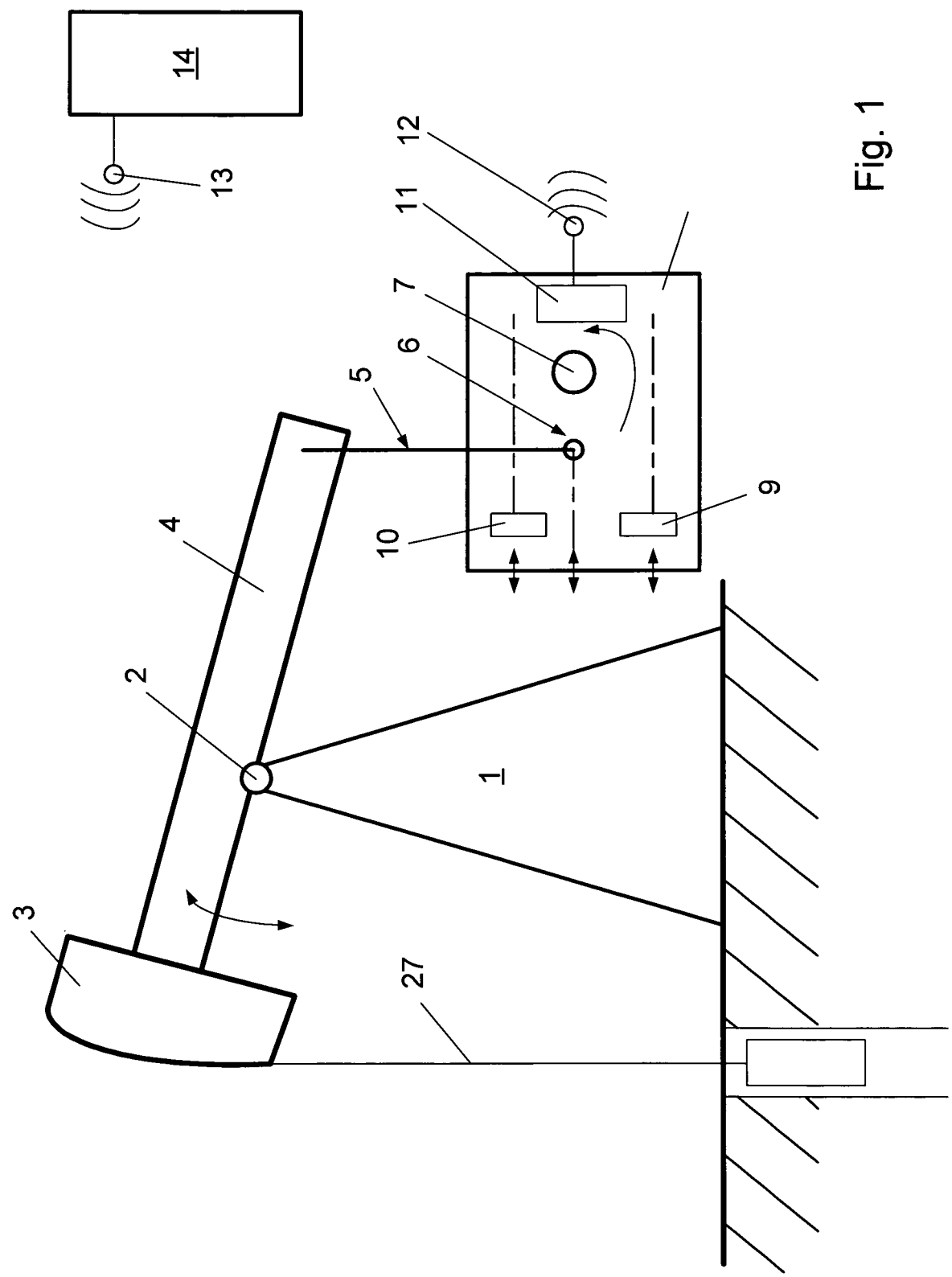
In FIG. 1, an oil pump is schematically illustrated.

FIG. 1 shows a bearing block 2, on which a rocker 4 is rotationally supported via a pivot bearing 2; rocker 4 includes a mount 3, which has a predefined distance to pivot bearing 2, a delivery rod system 27 being connected to mount 3. In a deep-well pump, the delivery rod system may also be referred to as oil pump rod system. On the side of rocker 4 that is situated opposite mount 3, a connecting rod 5 is situated on rocker 4, and a weight plate 8 is in turn attached to connecting rod 5. Weight plate 8 is fixedly connected to a driven shaft 7 of a gear unit 26 which is driven by an electric motor. That is to say, the driven shaft induces weight plate 8 to execute a rotary motion about the axis of driven shaft 7. Via a pivot bearing 6, connecting rod 5 is mounted on weight plate 8 and thus is driven in eccentric manner.

Tracks 20, which are aligned parallel to the connecting line between the axis of driven shaft 7 and the center point of pivot bearing 6 and on which balance weights (9, 10) are situated so as to be displaceable, are provided on the weight plate. In this context it is important that a shift in the center of gravity, in particular in the direction of the connecting line, is able to be achieved by shifting the balance weights.

This makes it possible to influence the method of operation of the oil pump, especially to lower the generator output per rotation of the driven shaft.

Electric drives, which are controlled by a computer unit 11, are situated on weight plate 8 in order to shift the balance weights. Computer unit 11 is connected to an antenna 12 for the exchange of data with a stationary computer unit. The stationary computer unit is connected to an antenna 13 for the purpose of exchanging data in contactless manner, especially via radio. In addition, it is connected to a device 14 for detecting the effective power of a rectifier for supplying an electric motor situated on the input side on gear unit 26. As a result, the effective power of the electric drive including gear unit 26 is able to be detected, and suitable control technology variables, such as minimum values and maximum values, may be determined from the time characteristic of the effective power.

Figure 3:
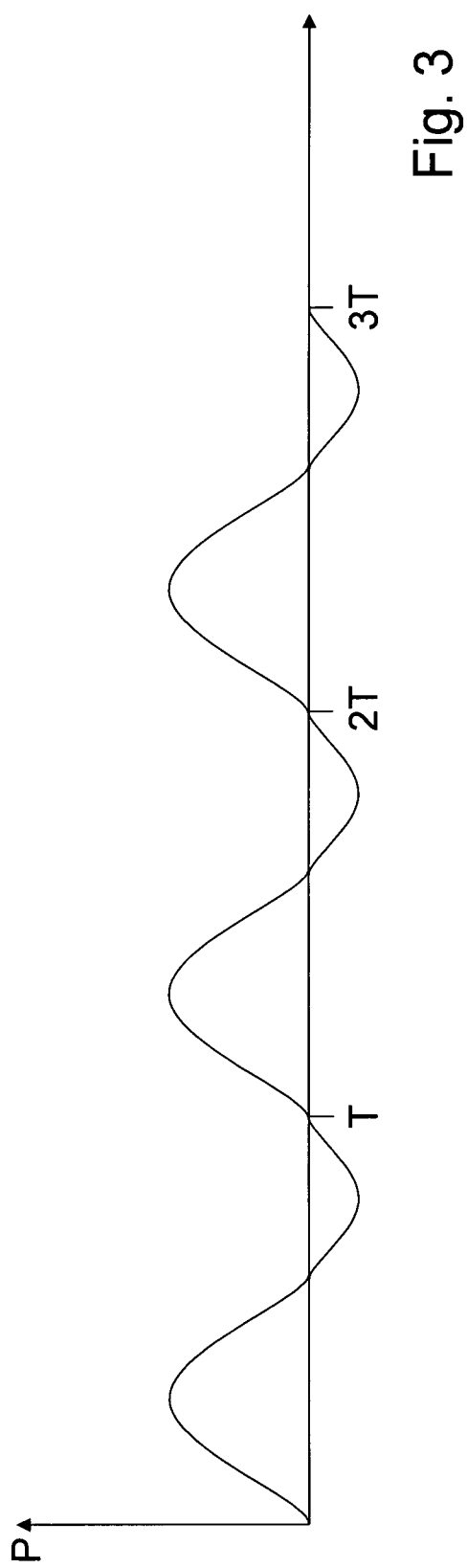
FIG. 3 illustrates the characteristic of the effective power as a function of time when the drive of the oil pump is operating as a generator in a subrange of each rotation.
Figure 4:
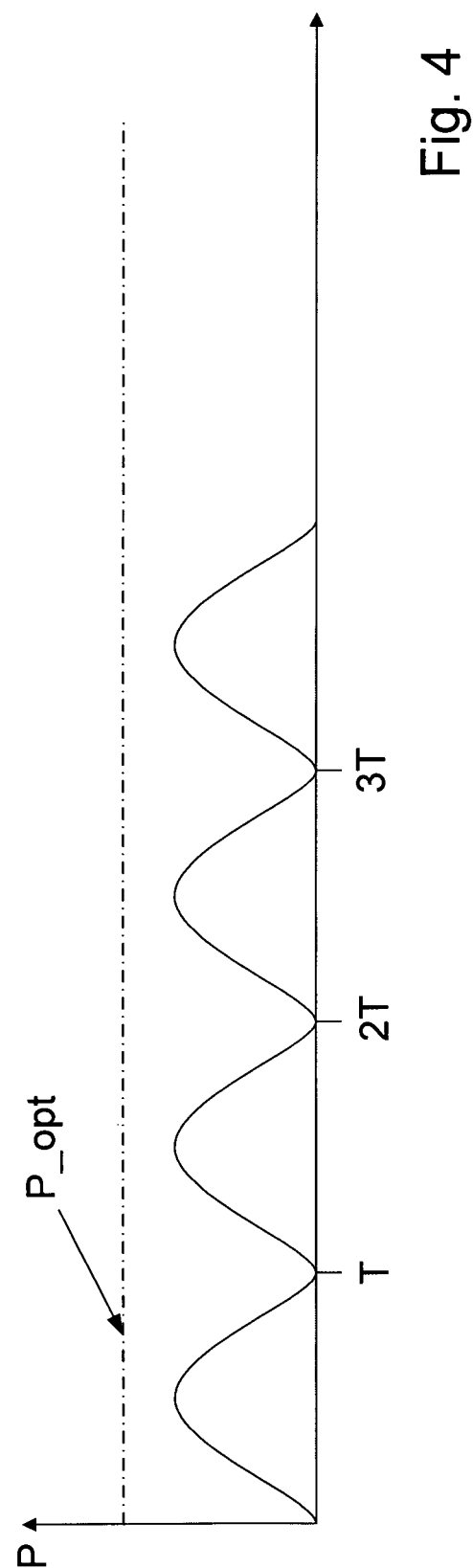
FIG. 4 illustrates the characteristic of the effective power as a function of time when the drive is operating as a motor during each rotation of the oil pump.

Based on the exemplary time characteristics of the effective power shown in FIGS. 3 and 4, the control method employed by the computer unit will now be elucidated in greater detail.

In FIG. 3, the time characteristic of effective power P, shown by way of example, has minimum values that lie in the negative range. This means that power produced via generator operation occurs at least in one time component per rotation, i.e., within one time interval of the rotation period or cycle duration T. Thus, the output of the motor for pumping purposes is used to an insufficient degree. The minimum values are forwarded to a controller as actual values and controlled toward the zero setpoint value or toward a small positive value in that the balance weights are shifted. The position of balance weights (9, 10) thus is used as actuating variable of the controller.

A linear controller such as a P controller, that is to say a proportional controller, or a PI controller or a PID controller may be used as controller.

When the characteristic of the effective power lies in the positive range, as shown in FIG. 4 by way of example, the maximum values are detected and controlled toward a setpoint value such as the nominal value of the electric motor which is driving gear unit 26, in that the distance between pivot bearing 6 and the axis of driven shaft 7 is adjusted with the aid of an additional electric drive, which is situated on weight plate 8. That is to say, pivot bearing 6 is mounted on the weight plate in displaceable manner. As a result, the lift travel is adjustable and may be used as actuating variable of the second controller.

The first and second controllers are able to be operated in alternation, for example. This means that the second controller is activated only after the generator time ranges in each rotation have vanished, and the second controller controls the peak values in the direction of the desired setpoint values of effective-power peak values.

As illustrated in FIG. 1, balance weights (9, 10) are displaceable along displacement tracks 20.

Figure 2:
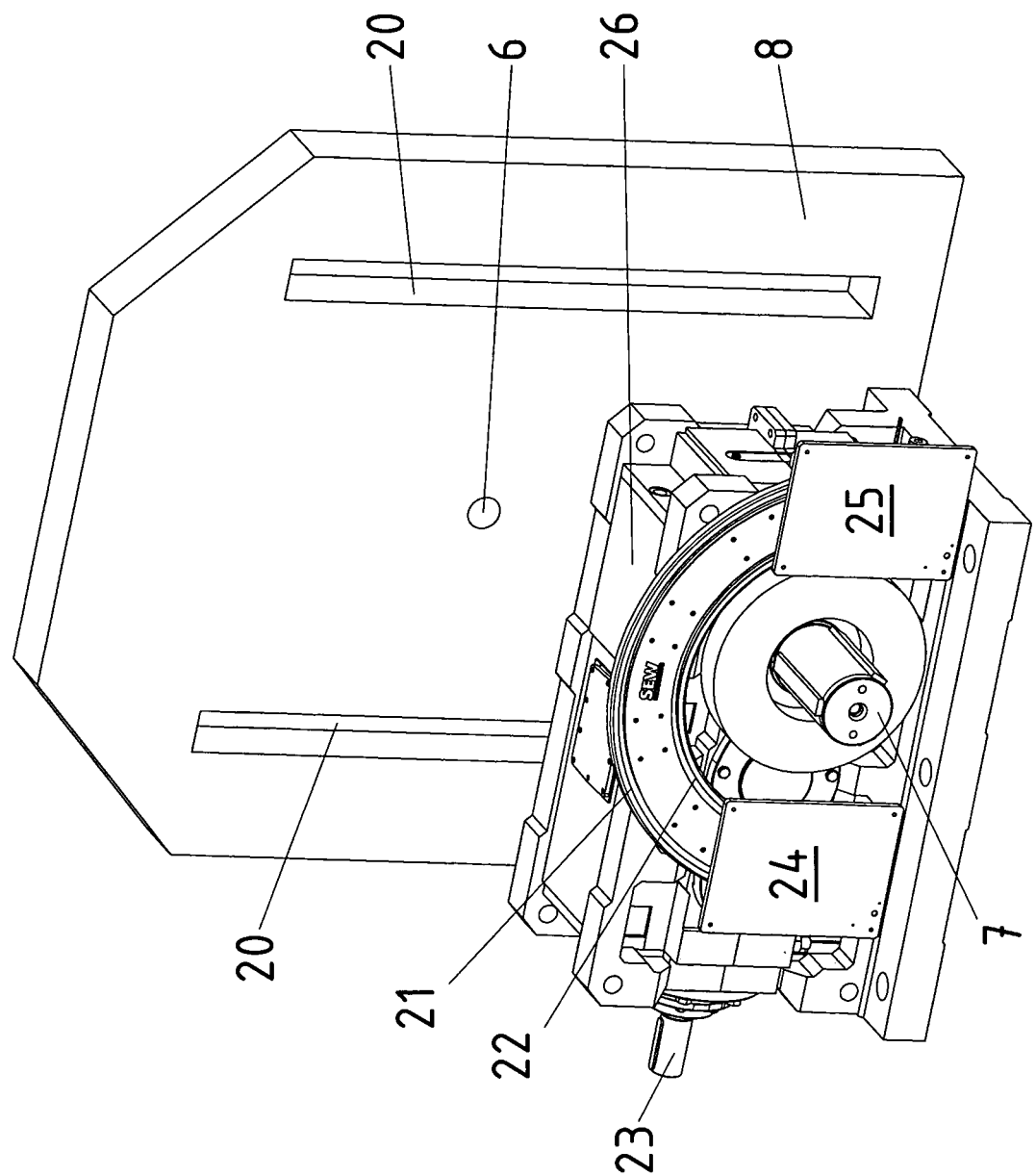
In FIG. 2, a gear unit of the oil pump is shown, which drives a weight plate 8.

In addition, the driven shaft of gear unit 26 is projecting from the gear unit on both sides, so that the weight plate is able to be designed in two parts, i.e., made of two weight plate pieces that are interconnected via a driven shaft 7. FIG. 2 shows weight plate piece 8 on a first axial side of driven shaft 7. The second weight plate piece is situated on the other axial side of driven shaft 7, parallel to illustrated weight plate piece 8. Two secondary windings (24, 25), which are inductively coupled to a primary conductor system, are fixed in place on each weight plate piece. The primary conductor system is implemented as a single, integrated current loop, to which an alternating current is applied by a supply source. The primary conductor system is composed of a primary conductor 21, which is implemented in the form of a ring and functions as incoming line, and of a primary conductor 22, which is likewise implemented in the form of a ring, extending concentrically to the former, and which acts as return return conductor.

Using the inductive coupling, energy is able to be transmitted in contactless manner to the consumers situated on the weight plate, i.e., electrical drives for the balance weights, an electrical drive for the axial distance adjustment, i.e., an electrical drive for adjusting the distance between pivot bearing 6 and the axis of driven shaft 7.

FIG. 2 shows input shaft 23, which is able to be driven by an electric motor (not shown) or by a combustion engine.

Secondary windings (24, 25) are realized as flat windings. Preferably, the flat windings are implemented around a T-shaped or E-shaped ferrite core, and the legs of the T or E are very short, in particular only twice as long as the width of the flat windings.

Preferably, linear actuators such as electrically driven spindle drives or synchronous linear motors, for example, are provided for adjusting the balance weights and/or the pivot bearing.

In exemplary embodiments of the present invention, the data are not forwarded via said radio transmission, but via an infrared transmission or some other contactless data transmission, especially in modulated form.

LIST OF REFERENCE CHARACTERS 1 bearing block
2 pivot bearing
3 mount for delivery rod system situated at a fixed distance from pivot bearing 2
4 rotationally mounted rod, in particular rocker
5 connecting rod
6 pivot bearing
7 driven shaft of a gear unit
8 weight plate
9 displaceably mounted balance weight
10 displaceably mounted balance weight
11 computer unit
12 antenna for a data exchange
13 antenna for a data exchange
14 device for detecting the effective power of a rectifier for supplying an electric motor situated on gear unit 26 on the input side
20 displacement track
21 primary conductor
22 primary conductor
23 input shaft
24 secondary winding
25 secondary winding
26 gear unit
27 delivery rod system, in particular oil pump rod system
T cycle duration
P effective power
P_Opt setpoint value for desired or optimal delivery volume

The invention claimed is:
1. A device, comprising:
a rocker;
a mount disposed on a first end of the rocker;
a connecting rod having a first end connected to a second end of the rocker;
a first pivot bearing for supporting the rocker on a bearing block;

a second pivot bearing connected to a second end of the connecting rod;

a weight plate connected to the second pivot bearing;

at least one balance weight, the weight plate including a track corresponding to each balance weight, wherein each balance weight is displaceable along the corresponding track in the weight plate; and a gear unit having a driven shaft connected to the weight plate.

2. The device according to claim 1, wherein the device is arranged as a pump adapted to pump crude oil.

3. A method for controlling a device having a connecting rod and at least one weight plate connected to the connecting rod via a pivot bearing, the weight plate including at least one track for displaceably accommodating at least one balance weight, comprising:

driving the connecting rod by a driven shaft that is connected to the weight plate and an electric drive, wherein the electric drive includes a gear unit driven by an electric motor;

recording an effective power of the electric drive based on a rectifier supplying the electric motor; and shifting the at least one balance weight along the at least one track as a function of the recorded effective power with at least one drive mounted on the weight plate.

4. The method according to claim 3, further comprising:

determining a local minimum from a characteristic of the effective power;

supplying an effective power value associated with the determined local minimum to a first controller as a first actual value;

controlling the first actual value toward a first setpoint value in that a displacement of the at least one balance weight along the at least one track is used as an actuating variable of the first controller in order to achieve a motor operation of the electric drive;

wherein the first setpoint value is zero or has a positive value that is smaller than one fifth of a nominal power or a permanently maximally allowed output of the electric drive.

* * * * *